Patented June 18, 1929.

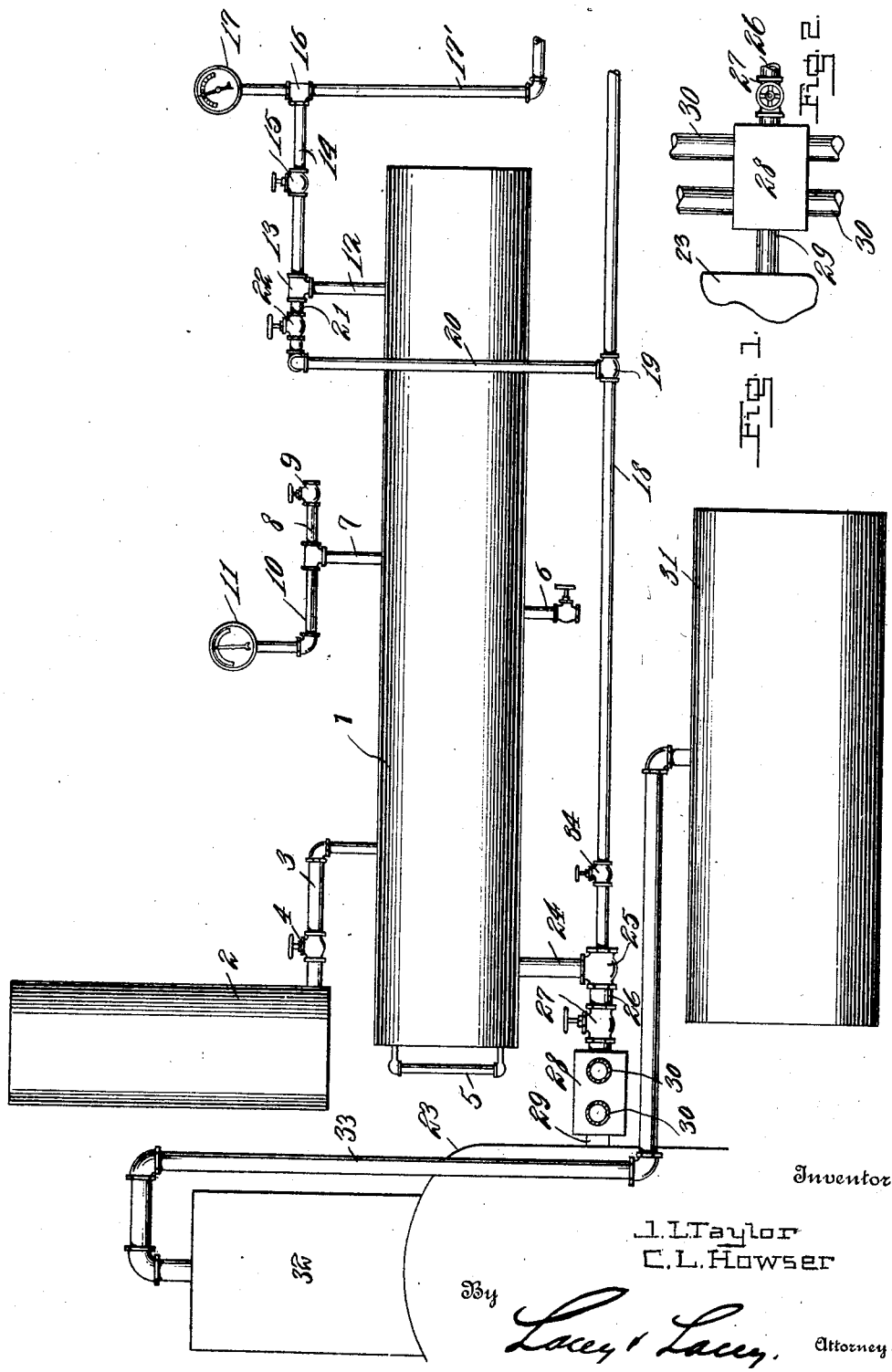

1,717,744

UNITED STATES PATENT OFFICE.

JESSE L. TAYLOR AND CHRISTOPHER L. HOWSER, OF SMACKOVER, ARKANSAS.

APPARATUS FOR CHEMICALLY TREATING NATURAL OILS.

Application filed October 26, 1926. Serial No. 144,298.

The present invention is directed to an apparatus for chemically treating natural oils.

The primary object of the invention is to provide an apparatus of this character constructed and arranged in such manner that the natural oil can be conducted directly from a well to be mixed with a chemical treating solution, the admixture of oil and solution being subjected to heat in order that the basic sediment in the natural oil can be removed therefrom after the mixture has been conveyed to a settling tank.

Another object of the invention is to provide an apparatus of this character so constructed as to be continuous in operation after having once been set in motion, and wherein the chemically treated solution or agent can be accurately regulated for best results.

Another object of the invention is to provide an apparatus of this kind wherein air under pressure, or natural gas, can be used separately or together to insure proper feeding of the chemical treating solution to its point for thorough commingling with the natural oil.

In the accompanying drawing:

Figure 1 is an elevational view, somewhat diagrammatic, showing the organized parts of the apparatus.

Figure 2 is a detail view of the oil and solution manifold.

Referring to the drawing, 1 designates a tank of suitable shape and dimensions and in which the chemical treating solution is contained. A tank 2 is located adjacent and above the tank 1 and serves to hold a reserve supply of solution, said tank being connected to the tank 1 by a pipe section 3, a suitable valve 4 being carried by said pipe section and operable when open to control the flow of solution to the tank 1 to replenish the supply thereof. The tank 1 has mounted upon one of its ends a liquid gauge 5 in order that the amount of the contents of said tank can be readily seen.

The tank 1 is also provided with a valved drain connection 6 in order that sediment collecting therein can be conveniently removed in order that the tank will be maintained in a thoroughly clean condition.

Since the chemical solution in the tank 1 is maintained under pressure and it is essential that it be replenished at intervals, a pipe 7 is connected thereto and has provided therefor a pressure outlet pipe 8 normally closed by a valve 9. It will be obvious that before the chemical solution from the tank 2 can enter the tank 1, it will be necessary to relieve the pressure in the latter tank and this is accomplished upon opening the valve 9. The pipe 8 is also connected with a pipe 10 having a pressure gauge 11 connected therewith in order that the pressure of the fluid in the tank 1 can be observed.

Rising from the tank 1 is a pipe section 12 having a T connection 13 upon its upper end and connected to one branch of this connection is a pipe 14 carrying a valve 15. The pipe 14 connects with a T connection 16 to one branch of which is secured a pressure gauge 17, while from the other branch thereof is a pipe 17' which leads from an air pump, not shown.

Extending longitudinally of the tank 1 is a natural gas conducting pipe line 18 having a union 19 to which is connected the lower end of a pipe 20, the upper end of which is connected with the T connection 13 by a pipe 21, the latter having a valve 22 associated therewith.

Leading from the bottom of the tank 1 adjacent the end thereof nearest the boiler 23, is a solution conducting pipe 24 which connects with the pipe line 18 through the union 25, and leading from this union is a pipe assembly 26 having a valve 27 associated therewith, said pipe assembly being in communication with the manifold 28. The manifold is connected to the boiler 23 by a pipe 29 and connected with said manifold are the pipe lines 30 which lead directly from the oil wells.

Conveniently located adjacent the boiler 23 is a settling tank 31. Leading from the dome 32 of the boiler is a pipe assembly 33 and it is through this assembly that the admixture of oil and solution heated in the boiler is conducted to the settling tank 31.

Briefly stated, the operation of the apparatus is as follows:

Assuming that the tank 1 is supplied with the chemical solution, such as commercially used for this purpose, and the gauges 11 and 17 show proper working pressure, the valve 15 is opened to permit the air to enter the tank 1 through the pipes 12. The valve 27 is then opened and the chemical solution enters the manifold, where it commingles with the oil conducted thereto through the pipes 30. The admixture of oil and chemical solution then passes into the boiler 23 through the pipe 29, where it is heated and is then conducted from the boiler through the pipe assembly 33 to the settling tank 31, where it stands for an allotted time in order to permit the petroleum to rise to the top and the basic sediment to settle upon the bottom of said tank, after which it is separated in any approved manner. The tank 31, as usual, will contain a quantity of water to wash the basic sediment. The oil is forced into the manifold and then into the boiler by pressure from the well.

Should it be desired to use gas only for forcing the solution from the tank 1 the valve 15 is closed and the valve 22 opened to permit the gas to pass from the line 18 into the tank through the pipes 20 and 12. If desired, the valve 34 in the pipe line 18 may be opened in order that gas injected into the union 25 will aid the gas pressure in the tank to assure a steady and increased flow of the solution.

It will be, of course, understood that gas and air can be used simultaneously and in order to do this the valve 22 is closed and the valves 15 and 34 opened.

Having thus described the invention, what we claim is:

An apparatus of the class described, comprising a tank, a boiler, a manifold having fluid communication with the boiler and tank, oil conducting pipes connected to the manifold, an air and a gas conducting pipe connected with the tank, means for controlling the admission of air and gas independently to the tank, said means being also operable to simultaneously admit air and gas to the tank, means for conducting a solution from the tank to the manifold to mix with the oil therein, means for discharging the mixture from the manifold into the boiler, a settling tank, and means for conducting the mixture from the boiler to the settling tank.

In testimony whereof we affix our signatures.

JESSE L. TAYLOR. [L. S.]
CHRISTOPHER L. HOWSER. [L. S.]